(12) United States Patent
Stegall

(10) Patent No.: US 6,471,377 B1
(45) Date of Patent: Oct. 29, 2002

(54) ILLUMINATED EXHAUST TAIL PIPE ASSEMBLY

(76) Inventor: Christopher G. Stegall, 1238 Clark St., Rock Springs, WY (US) 82901

( * ) Notice: Subject to any disclaimer, the term of this patent is extended or adjusted under 35 U.S.C. 154(b) by 0 days.

(21) Appl. No.: 09/811,207

(22) Filed: Mar. 19, 2001

(51) Int. Cl.$^7$ ................................................. B60Q 1/26
(52) U.S. Cl. ..................... 362/487; 362/496; 362/473; 362/544; 180/309
(58) Field of Search .................................. 362/487, 496, 362/502, 544, 473, 96, 213, 294; 180/294, 309

(56) References Cited

U.S. PATENT DOCUMENTS

| | | | | |
|---|---|---|---|---|
| 5,508,478 A | * | 4/1996 | Barry | 180/309 |
| 5,634,706 A | * | 6/1997 | Barry | 362/473 |
| 5,964,312 A | * | 10/1999 | Maldonado | 180/227 |
| 6,053,626 A | * | 4/2000 | Zagrodnik et al. | 362/473 |

* cited by examiner

*Primary Examiner*—Stephen Husar
*Assistant Examiner*—John Anthony Ward
(74) *Attorney, Agent, or Firm*—Phillip A. Rein

(57) ABSTRACT

An illuminated exhaust tail pipe assembly that can readily be attached to an existing vehicle exhaust system and including 1) a connector end section secured to the existing exhaust system; 2) an internal pipe assembly secured at one end to the connector end section; 3) an external pipe assembly connected at an inner end to the connector end section and mounted about an enclosing a major portion of the internal pipe assembly; and 4) an illuminated light assembly having at least one light bulb member mounted therein to provide a lighted area between an outer surface of the internal pipe assembly and an inner surface of the external pipe assembly. The external pipe assembly, at an inner end thereof, is provided with a plurality of air coolant holes and a light receiving opening. The air coolant holes can be equally spaced thereabout being of a number and size to provide the desired amount of coolant air to flow about an outer surface of the internal pipe assembly to achieve a coolant effect on the exhaust gases. The light receiving opening is adapted to receive a light bulb member therein and being activated through a tail light switch member to achieve illumination thereof when the normal tail light members on a vehicle are energized when darkness approaches.

18 Claims, 1 Drawing Sheet

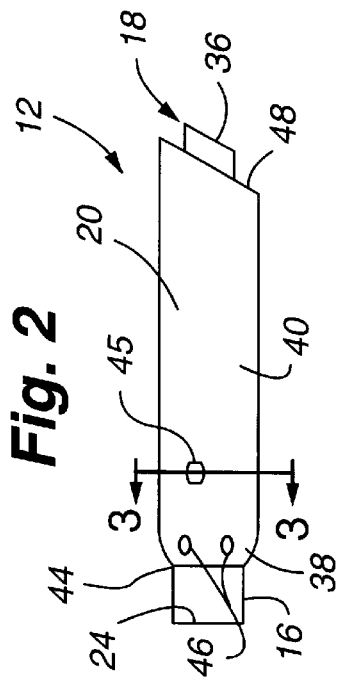
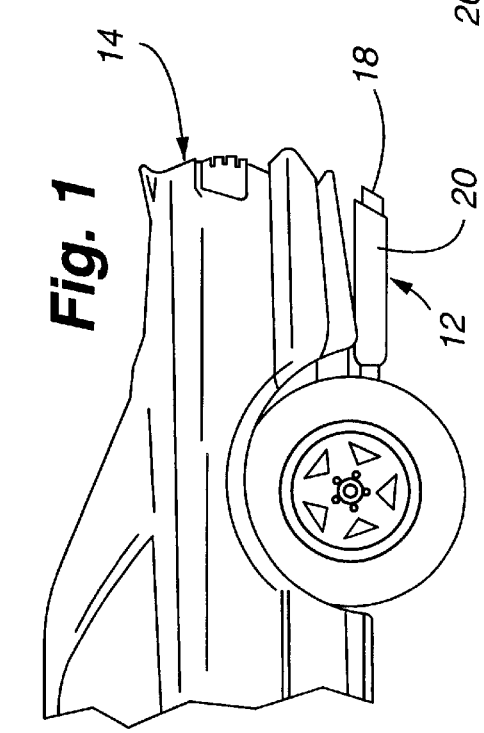
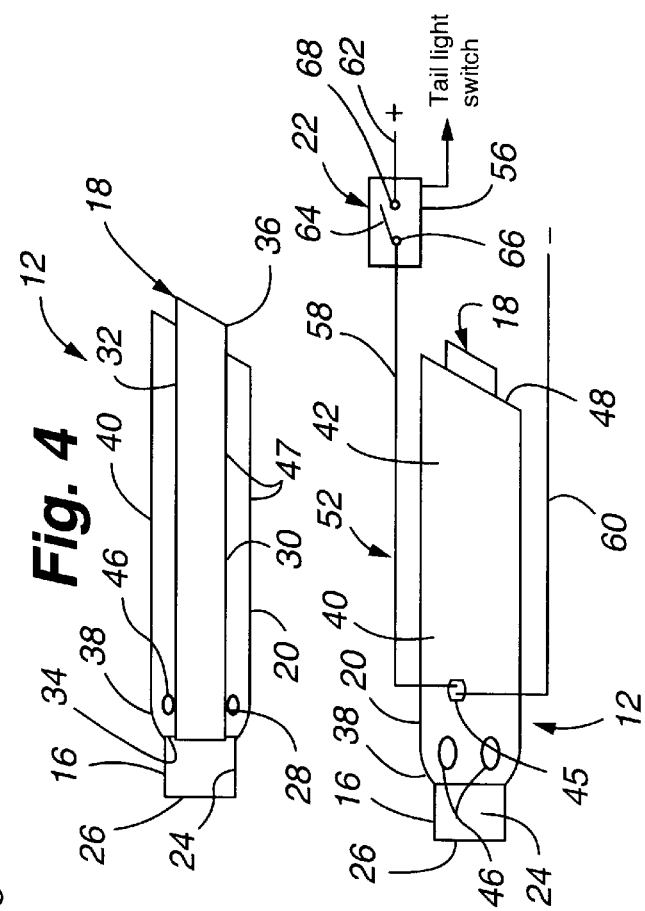

ILLUMINATED EXHAUST TAIL PIPE ASSEMBLY

The Barry U.S. Pat. No. 5,634,706 also discloses an illuminated gas tank or shell for use on a motorcycle.

The Maldonado U.S. Pat. No. 5,964,312 discloses a motorcycle combination suspension swing arm and light assembly serving to cover the axle nuts and axle adjustment screws. The light assembly is mounted on the rear wheel swing arm assembly and has various embodiments for safety purposes.

The Zagrodnik et al U.S. Pat. No. 6,053,626 discloses a motorcycle directional light bar and mainly concerned with turn signals and safety light elements.

PREFERRED EMBODIMENT OF THE INVENTION

In one preferred embodiment of this invention, an illuminated exhaust tail pipe assembly is operable to be attached to numerous sizes, types, and kinds of vehicles, normally an automobile or truck, and is secured to an outer end of an exhaust pipe system as by welding, clamps, or the like and positioned to be extended below and adjacent a rear fender portion of the subject vehicle.

The illuminated exhaust tail pipe assembly of this invention can be utilized on motorcycles, motor boats, or any place in which it is desired to have an illuminated tail pipe member extended rearwardly therefrom to provide an attractive appearance and cooling efficiency in a subject exhaust pipe system.

The illuminated exhaust tail pipe assembly includes 1) a connector end section operable to be connected to an outer end of an exhaust pipe system of a vehicle by welding or a clamp member; 2) an internal pipe assembly secured as by welding or the like to the connector end section; 3) an external pipe assembly mounted about the internal pipe assembly and enclosing the same; and 4) an illumination light assembly mounted through an opening in the external pipe assembly so as to provide illumination therein between an outer surface of the internal pipe assembly and an inner surface of the external pipe assembly and illumination rearwardly of an exhaust portion of the illumination exhaust tail pipe assembly.

The connector end section is of a pipe shape having a connector pipe member with an outer connector end which is secured to an outer end leading from a muffler and exhaust system of a vehicle.

The internal pipe assembly includes an inner support section integral at an outer end with a central pipe section which, in turn, is integral with an outer pipe section. The inner support section is provided with a connector portion secured as by welding to an outermost portion of the connector end section.

The outer pipe section is provided with a tapered end section or wall cut at an upward inclined angle to a longitudinal axis of the internal pipe assembly to provide an attractive appearance and provide for exhaust gases being discharged outwardly of an outer end of the external pipe assembly.

The external pipe assembly includes 1) an inner pipe section secured as by welding or the like to the outer surface of the connector end section and the connector portion of the inner support section; and 2) a middle pipe section integral at an inner end with the inner pipe section and, in turn, integral at an outer end with an exhaust pipe section. The inner pipe section has a connector section having therein 1) air coolant holes thereabout to provide for coolant air which will pass about an outer surface of the internal pipe assembly and effectively act to lower temperature of exhaust gases being dispensed therefrom; and 2) a light receiving opening.

The exhaust pipe section is provided with an outer tapered end wall provided at an angular relationship to its longitudinal axis similar to that for the internal pipe assembly. The tapered end wall is inwardly of the tapered end section or wall to prevent exhaust gases from entering the internal pipe assembly.

The illumination light assembly includes a light bulb member connected by electrical wire members, being a positive wire member and a negative ground wire member, through a tail light switch member. The light bulb member is mounted within the light receiving opening in an outer wall of the middle pipe section to provide an illumination source therein when illuminated through use of the tail light switch member.

The tail light switch member is provided with a positive switch wire member having an actuator lever which is moved to a closed position to interconnect contact points which, in turn, would provide for illumination of the light bulb member whenever the tail light switch member on a vehicle is moved to the closed or powered position.

It is obvious that more than one light bulb member can be placed within the openings about the external pipe assembly to provide the desired illumination and light intensity to be achieved therefrom.

Further, it is obvious that yellow, white, green, or other colors of light bulb members may be utilized therein to achieve the desired illumination and color effect therefrom.

In addition, it is obvious that illuminated exhaust tail pipe assembly can be made of various sizes of diameters and lengths as so required as to whether utilized on a simple scooter exhaust tail pipe assembly or on an exhaust tail pipe assembly on an 18-wheeler transport truck as merely a matter of choice.

OBJECTS OF THE INVENTION

One object of this invention is to provide an illuminated exhaust tail pipe assembly which can be easily connected to an outlet exhaust pipe on an exhaust system on a vehicle such as an automobile, truck, motorcycle, power boat, or the like to provide an attractive and unusual lighting effect.

Another object of this invention is to provide an illuminated exhaust tail pipe assembly which can be easily attached as by welding or a clamp member to a final exhaust pipe on a vehicle exhaust system on a vehicle and can be readily attachable to a power source as from a tail light assembly on the subject vehicle to provide a desired illumination to be obtained therefrom.

One other object of this invention is to provide an illuminated exhaust tail pipe assembly including an internal pipe assembly having an external pipe assembly mounted thereabout plus having a plurality of air coolant holes in the external pipe assembly which operates to provide a flow of coolant air therein to lower a temperature of the internal pipe assembly having hot exhaust gases being conveyed therethrough.

Still, one other object of this invention is to provide an illuminated exhaust tail pipe assembly which is unique in appearance when being observed in the night time with the light bulb or bulbs therein illuminated; is easy to install on the exhaust pipe of an existing exhaust vehicle system as by a clamp member or welding; economical to manufacture; and substantially maintenance free.

Various other objects, advantages, and features of the invention will become apparent to those skilled in the art from the following discussion, taken in conjunction with the accompanying drawings, in which:

FIGURES OF THE INVENTION

FIG. 1 is a fragmentary perspective view of a rear portion of an automobile having an illuminated exhaust tail pipe assembly of this invention connected to the automobile's exhaust system;

FIG. 2 is a side elevational view of the illuminated exhaust tail pipe assembly of this invention;

FIG. 3 is an enlarged sectional view taken along line 3—3 in FIG. 2;

FIG. 4 is a longitudinal vertical sectional view of the illuminated exhaust tail pipe assembly of this invention; and FIG. 5 is a view similar to FIG. 2 illustrating the illumination light assembly and an electrical connection to a tail light switch member in order to energize a light bulb member or members used in the illumination exhaust tail pipe assembly of this invention.

The following is a discussion and description of preferred specific embodiments of the illuminated exhaust tail pipe assembly of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

On referring to the drawings in detail, and in particular to FIG. 1, an illuminated exhaust tail pipe assembly of this invention, indicated generally at 12, is shown as being attached to an outer rear end of an exhaust pipe system on a rear area of an automobile 14.

It is obvious that the illuminated exhaust tail pipe assembly 12 can have its inner end thereof secured as by welding, a clamp member, or other means, to the outermost end section of an exhaust system, whether on a motorcycle, an automobile, a pick-up truck, or a power boat exhaust system and then connected to an electrical power source as will be described.

The illuminated exhaust tail pipe assembly 12 includes 1) a connector end section 16 adapted to be connected to the outermost end of a vehicle type exhaust system; 2) an internal pipe assembly 18 having an inner end secured to the connector end section 16; 3) an external pipe assembly 20 having its innermost end mounted about and connected as by welding to the internal pipe assembly 18; and 4) an illuminated light assembly or illumination means 22 mounted within a hole in the external pipe assembly 20 as will be noted and being operable to cause an illumination of the area between the internal pipe assembly 18 and the external pipe assembly 20.

The connector end section 16 has a connector pipe member 24 with an outer connector end 26. The connector end 26 can be welded or clamped onto the outer end of the exhaust system from which heated gases are exhausted outwardly from an internal combustion engine or the like.

The internal pipe assembly 18 has an inner support section 28 integral with a central pipe section 30 which, in turn, is integral with an outer pipe section 32.

The inner support section 28 is provided with a connector portion 34 secured as by welding at a junction of the outermost end of the connector pipe member 24 and the innermost end of the external pipe assembly 20 as shown in FIG. 4.

The outer pipe section 32 is provided with a tapered end portion or wall 36 which is tapered upwardly and outwardly to direct the exhaust gases outwardly of the external pipe assembly 20.

The external pipe assembly 20 is provided with an inner pipe section 38 integral with a middle pipe section 40 which, in turn, is integral with an exhaust pipe section 42.

The inner pipe section 38 is provided with a connector section 44 secured as by welding or the like with the conjoint connection of the connector end 26 of the connector end section 16 and the connector portion 34 of the inner support section 28 of the internal pipe assembly 18.

The connector section 44 is provided with a light bulb receiving opening or openings 45 and a plurality of air coolant holes 46. The air coolant holes 46 are operable to allow external air flow therethrough about an outer surface of the internal pipe assembly 18 which achieves an exhaust gas cooling process so that the temperature of the exhaust exit gases exiting the tapered end portion 36 of the outer pipe section 32 of the internal pipe assembly 18 is much lower in temperature than normally expected due to the coolant air flow. In fact, it has been found that the air coolant holes 46 can decrease the exhaust gas temperature by 50 percent.

As best noted in FIG. 5, the illumination light assembly 22 includes a light bulb member or light source 50 connected by electrical wire members 52 to a tail light switch member 56 to provide controlled electrical power, to the light bulb member 50 for illumination thereof.

The light bulb member 50 is mounted within the light bulb receiver opening 45 in the outer wall of the external pipe assembly 20 to provide an illumination therein between an inner wall of the external pipe assembly 20 and an outer wall of the internal pipe assembly 18.

It is obvious that a plurality of light bulb members 50 could be mounted in respective light bulb receiver openings 45 as shown by the one in FIG. 3 at various positions therein to control the desirable amount and intensity of the light source therein.

Further, it is obvious that the light bulb member or members 50 can be of various light intensities (voltage) and colors therein to give the desired illumination effect as will be noted.

The electrical wire members 52 include a positive wire member 58 and a negative or ground wire member 60 with the positive wire member 58 mounted through a tail light switch member 56.

The tail light switch member 56 has a positive switch wire member 62 and, on activation thereof, an actuator lever 64 interconnects contact posts 66, 68 to cause a flow of power to the light bulb member 50 to cause energization thereof.

It is obvious that various other power sources could be utilized to energize the light bulb member 50 but, on placing it within the tail light switch member 56, it will then be energized when the tail lights are turned on which is normally after dark and the desired time to provide the illuminating effect of the illuminated exhaust tail pipe assembly 12 of this invention.

USE AND OPERATION OF THE INVENTION

In the use and operation of the illuminated exhaust tail pipe assembly 12 of this invention, it is obvious that the connector end section 16 of the exhaust tail pipe assembly 12 can be secured as by welding, a clamp member, or the like to an outer end of the exhaust pipe system on a vehicle as noted in FIG. 1.

The illuminated exhaust tail pipe assembly 12 can be adjusted as desired to place the outer pipe section 32 and tapered end wall 48 thereof underneath a rear bumper portion of a vehicle and adjusted to extend outwardly to a desired position to achieve a desired illuminating light effect while also assuring that any exhaust gases therefrom will not be able to pass back within the vehicle driver's sitting compartment so as not to provide a dangerous threat due to the exhaust gases being emitted therefrom.

It is obvious that the air coolant holes 46 can be of various numbers and sizes thereof so as to achieve the desired flow of coolant air therethrough about the outer surface of the internal pipe assembly 18 to lower the temperature of the exhaust gases being discharged from the tapered end portion or wall 36 of the outer pipe section 32 of the internal pipe assembly 18.

It is noted that only one light bulb member 50 has been illustrated but it is obvious that there could be a plurality thereof mounted within respective light receiving openings 45 in the wall of the external pipe assembly 20 to achieve the desired illuminated effect. The light bulb member 50 can be provided in various colors thereof to achieve the desired illumination effect such as red, yellow, green, blue, or the like.

The internal pipe assembly 18 can be of various lengths and diameters, such as 2–3 inches in diameter, with the external pipe assembly 20 also of various lengths and diameters, such as 3–5 inches in diameter, as shown in FIG. 4.

During construction, an inner end of the connector pipe member 24, the connector portion 34 of the internal pipe assembly 18, and the connector section 48 of the external pipe assembly 20 are all interconnected by a common weld 45.

Further, the connector end section 16 and the internal pipe assembly 18 could be of a single pipe member and joined by the common weld 45 to the connector section 44 for ease of construction.

An external surface of the internal pipe assembly 18 and an internal surface of the external pipe assembly 20 can be coated with a baked on ceramic or heat resistant enamel coating 47 of a light reflective color to increase the illumination effect achieved from the illuminated exhaust tail pipe assembly 12.

The illuminated exhaust tail pipe assembly of this invention can be easily attached to an outer exhaust end of an exhaust pipe system on a vehicle requiring a minimum amount of skill and tools to do so; can be manufactured of a high strength steel or stainless steel material to withstand the extreme heat of the exhaust gases; attractive in appearance and of various colors; can be manufactured in various diameters and lengths as so required; can be provided with various degrees of light intensity perhaps color intensity to achieve the desired attractive appearance; economical to manufacture; and substantially maintenance free.

While the invention has been described in conjunction with preferred specific embodiments thereof, it will be understood that this description is intended to illustrate and not to limit the scope of the invention, which is defined by the following claims:

I claim:
1. An illuminated exhaust tail pipe assembly, comprising:
   a) an internal pipe assembly having one end adapted to be connected to a discharge end of a vehicle exhaust system;
   b) an external pipe assembly mounted about and secured to said internal pipe assembly; and
   c) an illumination means mounted between said internal pipe assembly and said external pipe assembly to provide an attractive glow being visible and directed only from a discharge area of a tail pipe assembly between said external pipe assembly and said internal pipe assembly.

2. An illuminated exhaust tail pipe assembly as described in claim 1, wherein:
   a) said external pipe assembly having an air coolant hole adjacent a connection of said internal pipe assembly and said external pipe assembly;
      whereby air flow through said air coolant hole acts to cool exhaust gases passing through said internal pipe assembly.

3. An illuminated exhaust tail pipe assembly as described in claim 1, wherein:
   a) said illumination means includes a plurality of independent light sources around said internal pipe assembly to provide desired light intensities to be emitted, directed, and visible only from the discharge area of the tail pipe assembly.

4. An illuminated exhaust tail pipe assembly as described in claim 1, wherein:
   a) said illumination means includes a plurality of independent light sources of preselected intensity and color to achieve a desired lighting effect.

5. An illuminated exhaust tail pipe assembly as described in claim 1, wherein:
   a) said external pipe assembly having a plurality of air coolant holes to achieve a desired preselected cooling of exhaust gases passing through said internal pipe assembly.

6. An illuminated exhaust tail pipe assembly as described in claim 1, wherein:
   a) an outer end of said internal pipe assembly extends outwardly of an outer end of said external pipe assembly to assure that exhaust gases will not flow into said outer end of said external pipe assembly as a safety feature.

7. An illuminated exhaust tail pipe assembly as described in claim 1, wherein:
   a) an external surface of said internal pipe assembly and an internal surface of said external pipe assembly provided with a special light reflective heat resistant coating to increase illumination from said illumination means.

8. An illuminated exhaust tail pipe assembly, comprising:
   a) a connector end section connected to a discharge end of an exhaust system;
   b) an internal pipe assembly having one end connected to said connector end section to receive and transfer exhaust from the exhaust system;
   c) an external pipe assembly having one end connected to a junction of said connector end section and said internal pipe assembly; and
   d) an air coolant opening in said external pipe assembly adjacent said connector end section to permit coolant air flow about said internal pipe assembly to cool the exhaust therein before discharge as a safety feature.

9. An illuminated exhaust tail pipe assembly as described in claim 8, including:
   a) an illumination means mounted between said internal pipe assembly and said external pipe assembly to provide an attractive glow being directed and visible only from a discharge area of a tail pipe assembly.

10. An illuminated exhaust tail pipe assembly as described in claim 9, wherein:
   a) said illumination means includes a plurality of independent light sources of preselected light intensities and light color.

11. An illuminated exhaust tail pipe assembly as described in claim 8, wherein:
   a) a plurality of said air coolant openings are provided of preselected number and size to achieve a desired cooling of the exhaust exiting from said internal pipe assembly.

12. An illuminated exhaust tail pipe assembly as described in claim 9, wherein:
   a) said air coolant opening allows cooling air to engage said illumination means to provide cooling and prevent damage thereto from a high temperature of the exhaust.

13. An illuminated exhaust tail pipe assembly as described in claim 8, wherein:
   a) an external surface of said internal pipe assembly and an internal surface of said external pipe assembly provided with a special light reflective heat resistant coating to increase illumination from said illumination means.

14. An illuminated exhaust tail pipe assembly as described in claim 8, wherein:
   a) an outer end of said internal pipe assembly extends outwardly of an outer end of said external pipe assembly to assure that exhaust gases will not flow into said outer end of said external pipe assembly as a safety feature from exhaust fumes.

15. An illuminated exhaust tail pipe assembly, comprising:
   a) an internal pipe assembly having one end adapted to be connected to a discharge end of a vehicle exhaust system
   b) an external pipe assembly constructed of an opaque material mounted about and secured to said internal pipe assembly; and
   c) an illumination means mounted between said internal pipe assembly and said external pipe assembly to provide an attractive glow directed only and visible from a discharge area of a tail pipe assembly.

16. An illuminated exhaust tail pipe assembly as described in claim 15, wherein:
   a) said illumination means includes one or more spaced independent light sources.

17. An illuminated exhaust tail pipe assembly as described in claim 16, wherein:
   a) said light sources of preselected light intensities and light colors.

18. An illuminated exhaust tail pipe assembly as described in claim 15, wherein:
   a) an internal surface of said external pipe assembly is provided with a light reflective coating to increase illumination from said discharge area of said tail pipe assembly.

* * * * *